US012596563B2

(12) United States Patent
Viswanathan

(10) Patent No.: US 12,596,563 B2
(45) Date of Patent: Apr. 7, 2026

(54) PHYSICAL HARDWARE DEVICE ACCESS VIA EMULATION

(71) Applicant: Juniper Networks, Inc., Sunnyvale, CA (US)

(72) Inventor: Sundareswaram Pallan Viswanathan, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 890 days.

(21) Appl. No.: 17/810,910

(22) Filed: Jul. 6, 2022

(65) Prior Publication Data

US 2023/0385092 A1    Nov. 30, 2023

(30) Foreign Application Priority Data

May 30, 2022    (IN) .............................. 202241030890

(51) Int. Cl.
G06F 9/455    (2018.01)

(52) U.S. Cl.
CPC ................... G06F 9/45558 (2013.01); *G06F 2009/45579* (2013.01)

(58) Field of Classification Search
CPC ................... G06F 9/45558; G06F 2009/45579
See application file for complete search history.

(56) References Cited

U.S. PATENT DOCUMENTS

| 11,188,376 | B1 * | 11/2021 | Alexander | .......... | G06F 9/45558 |
| 12,155,551 | B1 * | 11/2024 | Lamanna | ................ | H04L 43/12 |

| 2012/0005521 | A1 * | 1/2012 | Droux | ................. | H04L 41/0668 |
| | | | | | 718/1 |
| 2015/0116310 | A1 * | 4/2015 | Baudouin | ........... | G06F 9/45508 |
| | | | | | 345/419 |
| 2015/0178111 | A1 * | 6/2015 | Warszawski | .......... | G06F 9/4881 |
| | | | | | 718/1 |
| 2018/0336324 | A1 * | 11/2018 | Kodama | ............... | H04L 63/083 |
| 2019/0303342 | A1 * | 10/2019 | Jen | ...................... | G06F 13/4221 |
| 2020/0133876 | A1 * | 4/2020 | Bielski | ................. | G06F 9/4411 |
| 2021/0073025 | A1 * | 3/2021 | Duluk, Jr. | .............. | G06F 9/461 |
| 2021/0149587 | A1 * | 5/2021 | Lukoshkov | ........... | G06F 3/0655 |
| 2021/0157651 | A1 * | 5/2021 | Duluk, Jr. | ................. | G06T 1/20 |
| 2022/0029929 | A1 * | 1/2022 | Jain | ....................... | H04L 63/101 |
| 2022/0052904 | A1 * | 2/2022 | Howard | .............. | H04L 41/0654 |
| 2022/0138000 | A1 * | 5/2022 | Gepp | .................... | H04L 67/141 |
| | | | | | 718/1 |
| 2024/0045824 | A1 * | 2/2024 | Wang | .................. | G06F 15/7867 |

* cited by examiner

*Primary Examiner* — Lewis A Bullock, Jr.
*Assistant Examiner* — Kevin X Lu
(74) *Attorney, Agent, or Firm* — Harrity & Harrity, LLP

(57)    ABSTRACT

A virtualization system may receive, by a physical hardware device driver of a kernel of a guest OS of the virtualization system and from a process of the guest OS, one or more control messages to control a physical hardware device. The virtualization system may determine, by the physical hardware device driver and based on the second-type physical hardware device address included in the one or more control messages, a first-type physical hardware device address associated with the physical hardware device. The virtualization system may update, by the physical hardware device driver, the one or more control messages to include the first-type physical hardware device address, and may send, by the physical hardware device driver and to an emulated physical hardware device of a hypervisor of a host OS of the virtualization system, the one or more control messages.

20 Claims, 8 Drawing Sheets

100

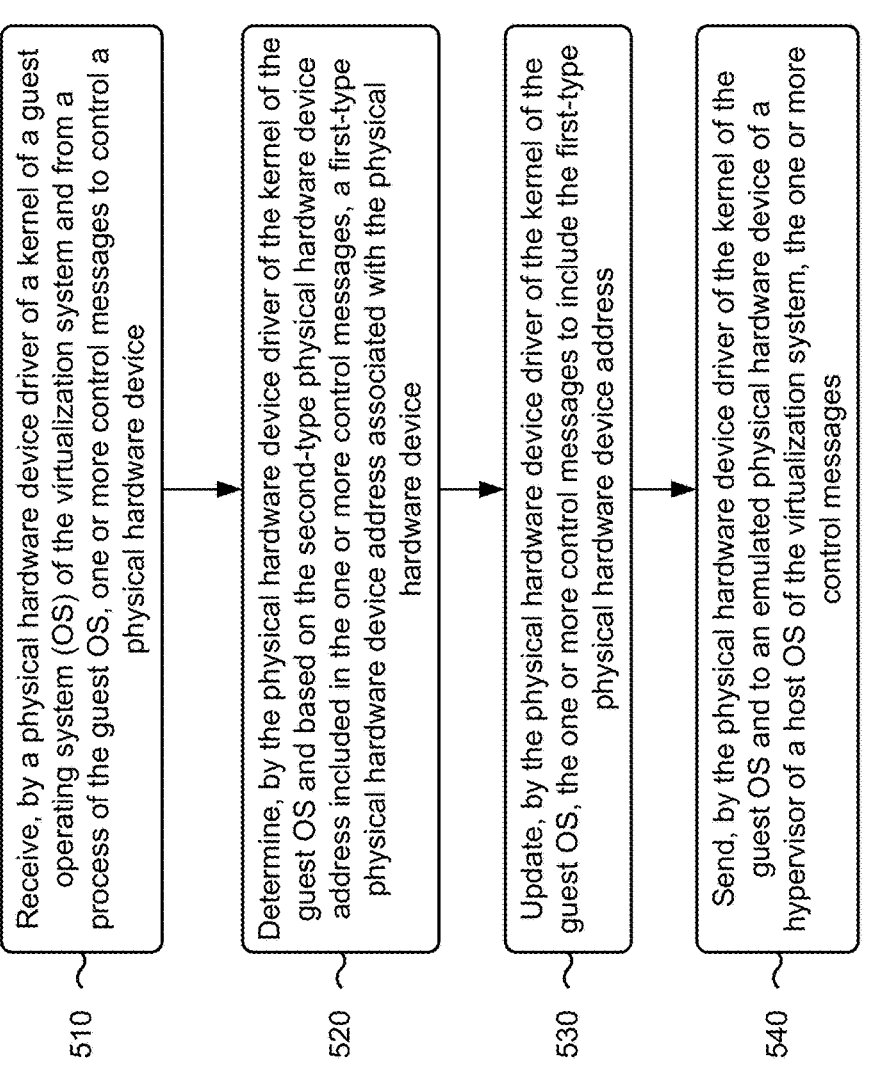

500

510 Receive, by a physical hardware device driver of a kernel of a guest operating system (OS) of the virtualization system and from a process of the guest OS, one or more control messages to control a physical hardware device 520 Determine, by the physical hardware device driver of the kernel of the guest OS and based on the second-type physical hardware device address included in the one or more control messages, a first-type physical hardware device address associated with the physical hardware device 530 Update, by the physical hardware device driver of the kernel of the guest OS, the one or more control messages to include the first-type physical hardware device address 540 Send, by the physical hardware device driver of the kernel of the guest OS and to an emulated physical hardware device of a hypervisor of a host OS of the virtualization system, the one or more control messages

FIG. 5

PHYSICAL HARDWARE DEVICE ACCESS VIA EMULATION

CROSS-REFERENCE TO RELATED APPLICATION

This application claims priority to India Patent Application No. 202241030890, entitled "LOW PIN COUNT (LPC) DEVICE ACCESS VIA EMULATION," and filed on May 30, 2022. The entire content of the above-referenced application is expressly incorporated herein by reference.

BACKGROUND

Modern data centers have been moving into the realm of virtualization, where resources like CPU, memory, and disk are virtualized and shared among virtual machines.

SUMMARY

Some implementations described herein relate to a non-transitory computer-readable medium that stores a set of instructions for a virtualization system. The set of instructions, when executed by one or more processors of the virtualization system, may cause the virtualization system to receive, by a physical hardware device driver of a kernel of a guest operating system (OS) of the virtualization system and from a process of the guest OS, one or more control messages to control a low pin count (LPC) physical hardware device, wherein the one or more control messages are peripheral component interconnect express (PCIEe) control messages that include a PCIe address associated with the LPC physical hardware device. The set of instructions, when executed by one or more processors of the virtualization system, may cause the virtualization system to determine, by the physical hardware device driver of the kernel of the guest OS and based on the PCIe address included in the one or more control messages, an LPC address associated with the physical hardware device. The set of instructions, when executed by one or more processors of the virtualization system, may cause the virtualization system to update, by the physical hardware device driver of the kernel of the guest OS, the one or more control messages to include the LPC address. The set of instructions, when executed by one or more processors of the virtualization system, may cause the virtualization system to send, by the physical hardware device driver of the kernel of the guest OS and to an emulated physical hardware device of a hypervisor of a host OS of the virtualization system, the one or more control messages.

Some implementations described herein relate to a virtualization system. The virtualization system may include one or more memories and one or more processors. The virtualization system may be configured to receive, by a physical hardware device driver of a kernel of a guest OS of the virtualization system and from a process of the guest OS, one or more control messages to control a physical hardware device, wherein the physical hardware device is a first-type physical hardware device, and wherein the one or more control messages are second-type physical hardware device control messages that include a second-type physical hardware device address associated with the physical hardware device. The virtualization system may be configured to determine, by the physical hardware device driver of the kernel of the guest OS and based on the second-type physical hardware device address included in the one or more control messages, a first-type physical hardware device address associated with the physical hardware device. The virtualization system may be configured to update, by the physical hardware device driver of the kernel of the guest OS, the one or more control messages to include the first-type physical hardware device address. The virtualization system may be configured to send, by the physical hardware device driver of the kernel of the guest OS and to an emulated physical hardware device of a hypervisor of a host OS of the virtualization system, the one or more control messages.

Some implementations described herein relate to a method. The method may include receiving, by an emulated physical hardware device of a hypervisor of a host OS of a virtualization system and from a physical hardware device driver of a guest OS of the virtualization system, one or more control messages to control a physical hardware device, where the physical hardware device is a first-type physical hardware device, and where the one or more control messages are second-type physical hardware device control messages that include a first-type physical hardware device address associated with the physical hardware device. The method may include sending, by the emulated physical hardware device of the hypervisor of the host OS and to a hypervisor device driver of the hypervisor of the host OS, the one or more control messages. The method may include updating, by the hypervisor device driver of the hypervisor of the host OS, the one or more control messages to be first-type physical hardware device control messages that include the first-type physical hardware device address associated with the physical hardware device. The method may include sending, by the hypervisor device driver of the hypervisor of the host OS, to a kernel device driver of a kernel of the host OS, and based on updating the one or more control messages, the one or more control messages. The method may include receiving, by the kernel device driver of the kernel of the host OS and from the hypervisor device driver of the hypervisor of the host OS, the one or more control messages. The method may include sending, by the kernel device driver of the kernel of the host OS and to the physical hardware device, the one or more control messages.

BRIEF DESCRIPTION OF THE DRAWINGS

FIG. 5 is a flowchart of an example process associated with physical hardware device access via emulation.

DETAILED DESCRIPTION

Figure 1A:
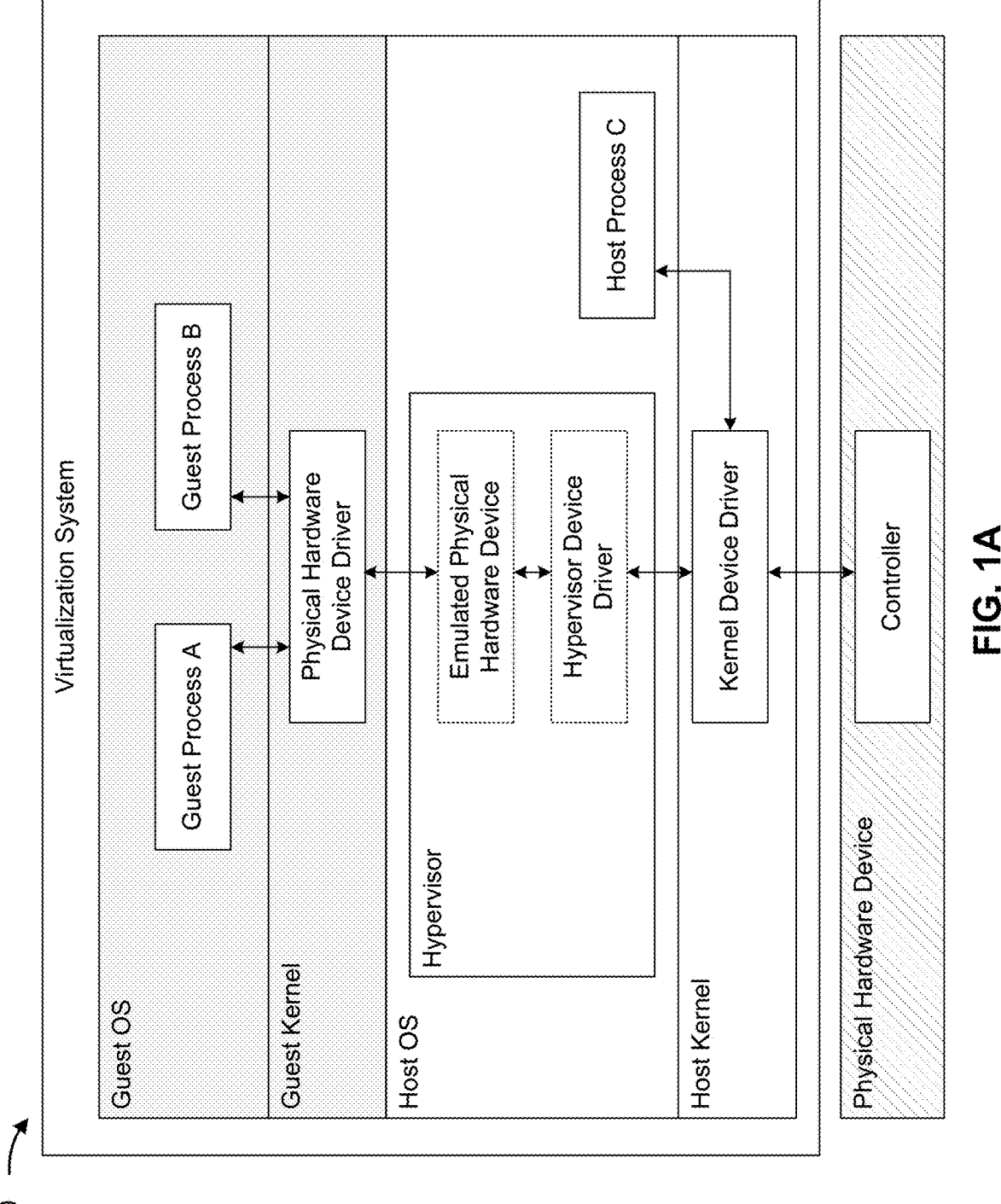
FIGS. 1A-1D are diagrams of one or more example implementations described herein.

The following detailed description of example implementations refers to the accompanying drawings. The same reference numbers in different drawings may identify the same or similar elements.

A virtual machine (VIVI) may include a software implementation of a machine (e.g., a computing device) that executes programs like a physical machine. The VM may include a system platform that supports the execution of a complete operating system (OS), hereinafter referred to as a guest OS. A network device (e.g., a server device, sometimes referred to as a VM server) provides virtualization of a VM and the guest OS via a software layer called a hypervisor.

Accordingly, the VM and the guest OS of the network device may use the services of the hypervisor. The hypervisor can run on a host OS of the network device. The host OS can include a host OS kernel that facilitates access to a physical hardware device (e.g., a peripheral component interconnect express (PCIe) device) by the guest OS. For example, a device driver can be implemented in the host OS kernel to provide access to the physical hardware device by the guest OS. However, in many cases, the host OS kernel cannot facilitate access to particular hardware devices, such as low pin count (LPC) devices, by the guest OS, or must implement a locking scheme to prevent simultaneous access (e.g., read and/or write access) to the particular hardware devices (e.g., by the host OS and the guest OS).

Some implementations described herein provide a virtualization system with a host OS, a kernel of the host OS, a guest OS, and a kernel of the guest OS. The virtualization system is configured to provide access to a physical hardware device of a first type (e.g., an LPC physical hardware device), by a process of the guest OS, by emulating the physical hardware device as a second-type physical hardware device (e.g., as a PCIe device) in a hypervisor of the host OS.

In some implementations, the kernel of the host OS includes a kernel device driver that provides access to the first-type physical hardware device (e.g., because the kernel device driver is connected to a controller of the physical hardware device via a bus). The host OS includes a hypervisor (e.g., a QEMU hypervisor) that is configured to provide access to the first-type physical hardware device. For example, the hypervisor includes a hypervisor device driver (e.g., a QEMU device driver) that accesses the first-type physical hardware device (e.g., by communicating with the kernel device driver). Additionally, the hypervisor includes an emulated physical hardware device (e.g., an emulated second-type physical hardware device), which is configured to provide access to the first-type physical hardware device (e.g., by a process of the guest OS) by emulating a second-type physical hardware device that is accessible by the process of the guest OS. The kernel of the guest OS includes a physical hardware device (e.g., a second-type physical hardware device driver) that is configured to communicate with the emulated physical hardware device driver of the hypervisor of the host OS.

In some implementations, to control the physical hardware device, a process of the guest OS sends one or more second-type control messages (e.g., PCIe control messages) to the physical hardware device driver of the kernel of the guest OS kernel. The one or more second-type control messages include a second-type physical hardware device address associated with the physical hardware device. The physical hardware device driver updates the one or more second-type control messages to include a first-type physical hardware device address associated with the physical hardware device and then sends the one or more second-type control messages to the emulated physical hardware device of the hypervisor of the host OS, which may send the one or more second-type control messages to the hypervisor device driver of the hypervisor of the host OS. The hypervisor device driver updates the one or more second-type control messages to be one or more first-type control messages (e.g., LPC control messages), and sends the one or more first-type control messages to the kernel device driver of the kernel of the host OS, which sends the one or more first-type control messages to the physical hardware device. In this way, the process of the guest OS is able to control the physical hardware device by providing second-type control messages, even though the physical hardware device is a first-type physical hardware device.

In some implementations, to control the physical hardware device, a process of the host OS sends one or more first-type control messages (e.g., LPC control messages) to the kernel device driver of the kernel of the host OS, which sends the one or more first-type control messages to the physical hardware device. In this way, the process of the host OS is also able to control the physical hardware device (e.g., by providing the one or more first-type control messages) at a same time as the process of the guest OS (e.g., the process of the host OS and the guest OS may each send one or more control messages to control the physical hardware device within a particular time window). For example, in some implementations, the physical hardware device includes a controller that receives and serializes control messages (e.g., saves the control messages in a queue, such as a first-in-first-out (FIFO) queue, and processes the control messages serially) from any source (e.g., the process in the guest OS and/or the process in the host OS).

In this way, the physical hardware device does not need to be locked to be controlled by the process of the guest OS and/or the process of the host OS. This improves efficient use of the physical hardware device and improves a performance of the each of the process of the guest OS and/or the process of the host OS (e.g., because the processes do not need to generate and send control messages to lock and unlock the physical hardware device). This also decreases a usage of computing resources (e.g., processing resources, memory resources, communication resources, and/or power resources, among other examples) of the virtualization system that would otherwise be needed to enable locking and unlocking of the physical hardware device.

FIGS. 1A-1D are diagrams of one or more example implementations 100 described herein. Example implementation(s) 100 may include a virtualization system and a physical hardware device. The virtualization system and the physical hardware device are described in more detail below in connection with FIGS. 2-4.

As shown in FIG. 1A, the virtualization system may include a host OS and a guest OS. The host OS may include a hypervisor, which includes an emulated physical hardware device and a hypervisor device driver. A kernel of the host OS may include a kernel device driver. A kernel of the guest OS may include a physical hardware device driver. One or more processes (shown as guest processes A and B) may run in the guest OS. One or more processes (shown as host process C) may run in the host OS.

In some implementations, the physical hardware device may be a first-type physical hardware device, such as an LPC physical hardware device, and may be connected to the kernel device driver of the kernel of the host OS (e.g., via a bus between a controller of the physical hardware device and the kernel device driver of the kernel of the host OS). Accordingly, the physical hardware device may be associated with a first-type physical hardware device address, such as an LPC address. The first-type physical hardware device address may have a first bit length (e.g., the LPC address may be 8 bits), and the one or more processes of the host OS, to control the physical hardware device, may provide one or more first-type physical hardware device control signals that include the first-type physical hardware device address (e.g., as further described herein). In some implementations, the physical hardware device may "appear" (e.g., based on one or more actions of the physical hardware device driver of the kernel of the guest OS, the emulated physical hardware device of the hypervisor of the host OS, the hypervisor device driver of the hypervisor of the host OS, and/or the kernel device driver of the kernel of the host OS) as a second-type physical hardware device, such as a PCIe physical hardware device, to the one or more processes of the guest OS (e.g., as further described herein). Accordingly, the physical hardware device may be associated with a second-type physical hardware device address, such as a PCIe address. The second-type physical hardware device address may have a second bit length (e.g., the PCIe address may be 32 bits) that may be different from the first bit length. The one or more processes of the guest OS, to control the physical hardware device, may provide one or more second-type physical hardware device control signals that include the second-type physical hardware device address (e.g., as further described herein).

Figure 1B:
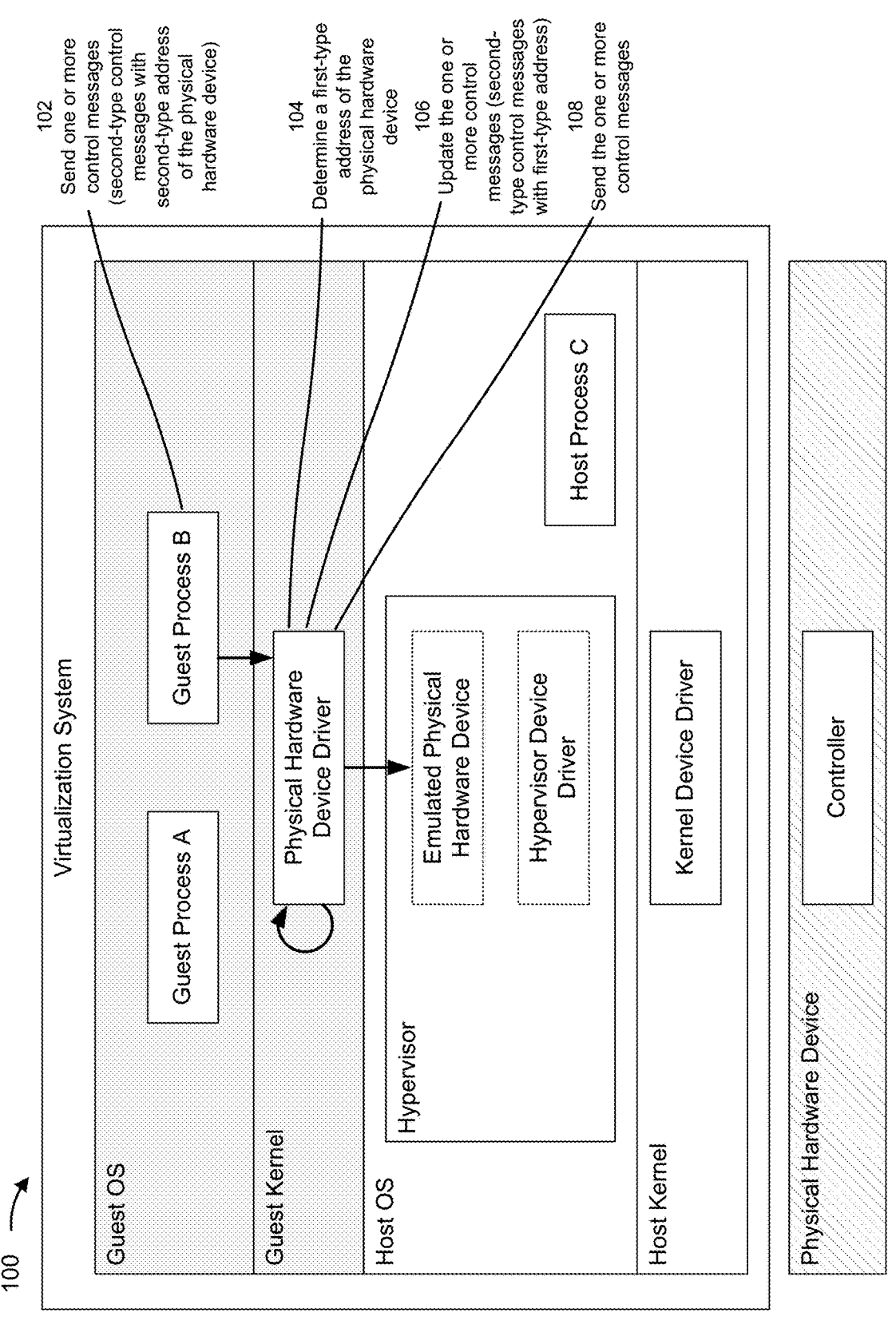

As shown in FIG. 1B, and by reference number 102, a process of the guest OS (e.g., shown as guest process B) may send one or more control messages to control the physical hardware device. The one or more control messages may include, for example, instructions for the physical hardware device to perform a read action, a write action, and/or another action. The process may send the one or more control messages to the physical hardware device driver of the kernel of the guest OS and, accordingly, the physical hardware device driver of the kernel of the guest OS may receive the one or more control messages from the process.

In some implementations, the physical hardware device may be a first-type physical hardware device and the one or more control messages may be second-type physical hardware device control messages (e.g., control messages formatted to control a second-type physical hardware device). For example, the physical hardware device may be an LPC physical hardware device, and the one or more control messages may be PCIe control messages. That is, the physical hardware device may be a first-type physical hardware device that appears to the guest OS as a second-type physical hardware device. Therefore, the process of the guest OS may generate one or more second-type control messages to control the physical hardware device.

Additionally, the one or more control messages may include a second-type physical hardware device address (e.g., as described above) associated with the physical hardware device. For example, the process of the guest OS may search a data structure (e.g., a database, a table, an electronic file, or another data structure that is included in and/or accessible to the guest OS) that stores entries indicating physical hardware device addresses associated with physical hardware devices. Accordingly, because the physical hardware device appears as a second-type physical hardware device to the guest OS, the process may identify an entry in the data structure that indicates that the physical hardware device is associated with the second-type physical hardware device address. The process may therefore generate the one or more control messages as second-type physical hardware device control messages that include the second-type physical hardware device address. For example, the process may generate one or more PCIe control messages that include a PCIe address associated with the physical hardware device (e.g., when the physical hardware device is an LPC physical hardware device). The PCIe address associated the physical hardware device may be, for example, 32 bits.

As shown by reference number 104, the physical hardware device driver of the kernel of the guest OS may determine a first-type physical hardware device address (e.g., as described above) of the physical hardware device (e.g., based on the second-type physical hardware device address included in the one or more control messages). For example, the physical hardware device may determine an LPC address associated with the physical hardware device (e.g., based on the PCIe address associated with the physical hardware device that is included in the one or more control messages). The PCIe address associated the physical hardware device may be, for example, 8 bits.

As an example, the physical hardware device driver may process (e.g., parse and/or read) the one or more control messages to identify the second-type physical hardware device address included in the one or more control messages. The physical hardware device driver may search (e.g., based on the second-type physical hardware device address) a data structure (e.g., a database, a table, an electronic file, or another data structure that is included in and/or accessible to the kernel of the guest OS) that stores entries indicating first-type physical hardware device addresses and second-type physical hardware device addresses of physical hardware devices. Accordingly, based on the second-type physical hardware device address, the physical hardware device driver may identify an entry in the data structure that indicates that the first-type physical hardware device address is associated with the physical hardware device.

As shown by reference number 106, the physical hardware device driver of the kernel of the guest OS may update the one or more control messages (e.g., that the physical hardware device driver of the kernel received from the process of the guest OS). In some implementations, the physical hardware device driver may update the one or more control messages to include the first-type physical hardware device address (and to not include the second-type physical hardware device address) of the physical hardware device. For example, the physical hardware device driver may update the one or more control messages to include the LPC address (and to not include the PCIe address) of the physical hardware device.

As shown by reference number 108, the physical hardware device driver may send the one or more control messages to the emulated physical hardware device of the hypervisor of the host OS (e.g., after updating the one or more control messages). Accordingly, the emulated physical hardware device of the hypervisor may receive the one or more control messages from the physical hardware device driver, such that the one or more control messages are second-type physical hardware device control messages that include the first-type physical hardware device address associated with the physical hardware device. For example, the emulated physical hardware device of the hypervisor may receive the one or more control messages from the physical hardware device driver, such that the one or more control messages are PCIe messages that include the LPC address associated with the physical hardware device.

Figure 1C:
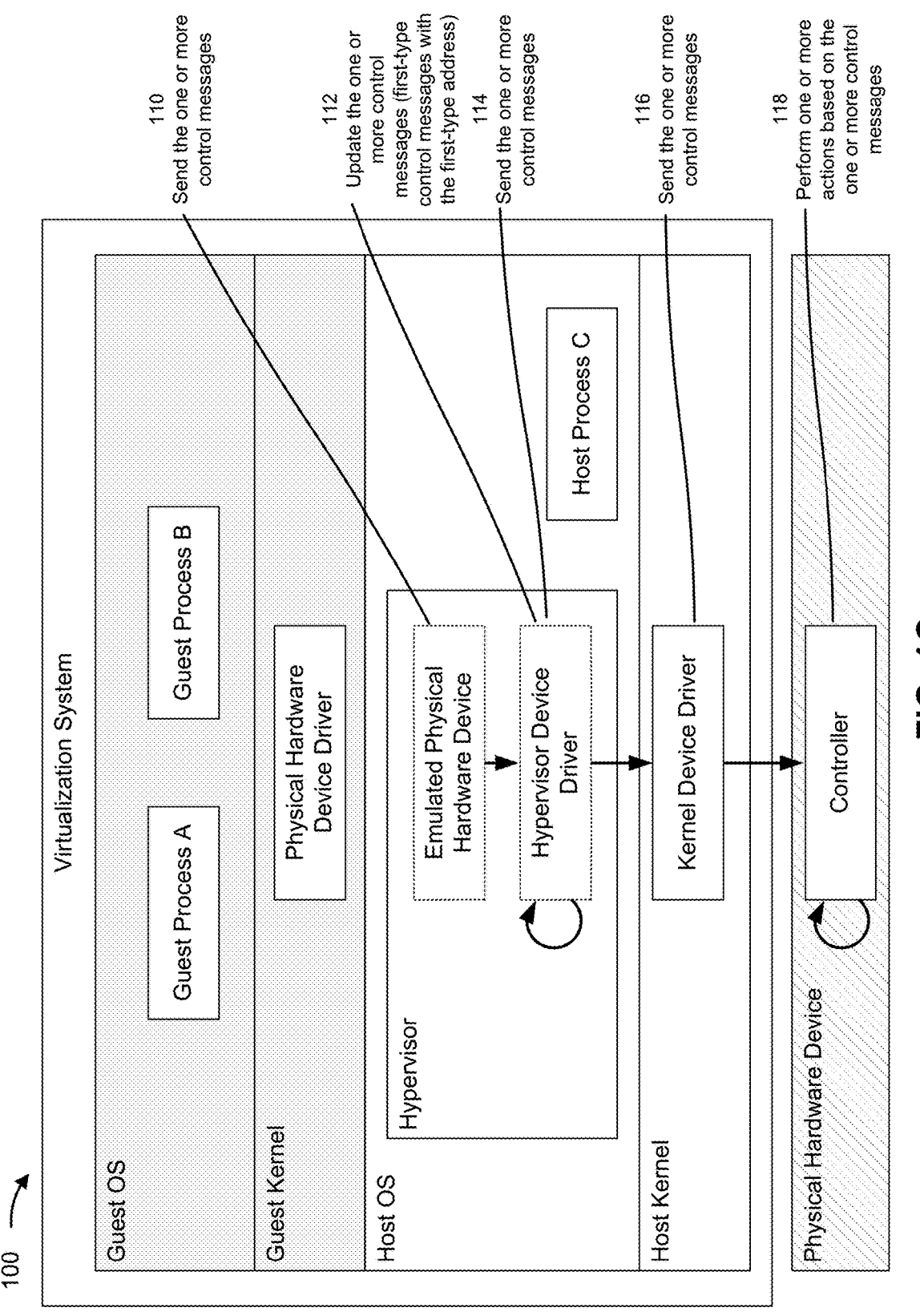

Accordingly, as further described herein in relation to FIG. 1C, sending, by the process of the guest OS and to the emulated physical hardware device (e.g., via the physical hardware device driver of the kernel of the guest OS), the one or more control messages is to cause control, by the process of the guest OS, of the physical hardware device based on the one or more control messages.

As shown in FIG. 1C, and by reference number 110, the emulated physical hardware device of the hypervisor may send the one or more control messages to the hypervisor device driver of the hypervisor. Accordingly, the hypervisor device driver of the hypervisor may receive the one or more control messages from the emulated physical hardware device of the hypervisor (e.g., where the one or more control messages are second-type physical hardware device control messages that include the first-type physical hardware device address associated with the physical hardware device).

As shown by reference number 112, the hypervisor device driver of the hypervisor may update the one or more control messages (e.g., that the hypervisor device driver of the hypervisor received from the emulated physical hardware device of the hypervisor). In some implementations, the hypervisor device driver may update the one or more control messages to be first-type physical hardware device control messages (and to no longer be second-type physical hardware device control messages). For example, the hypervisor device driver may update the one or more control messages to be LPC control messages (and to no longer be PCIe control messages). In some implementations, the hypervisor device driver may process (e.g., parse and/or read) the one or more control messages to identify the first-type physical hardware device address included in the one or more control messages, and may therefore, based on the first-type physical hardware device address, update the one or more control messages to be first-type physical hardware device control messages. For example, the hypervisor device driver may process (e.g., parse and/or read) the one or more control messages to identify the LPC address included in the one or more control messages, and may therefore, based on the LPC address, update the one or more control messages to be LPC control messages. In this way, after updating by the hypervisor device driver, the one or more control messages may be first-type physical hardware device control messages that include the first-type physical hardware device address associated with the physical hardware device. For example, after updating by the hypervisor device driver, the one or more control messages may be LPC control messages that include the LPC address associated with the physical hardware device.

As shown by reference number 114, the hypervisor device driver of the hypervisor of the host OS may send the one or more control messages to the kernel device driver of the kernel of the host OS. Accordingly, the kernel device driver of the kernel of the host OS may receive the one or more control messages from the hypervisor device driver of the hypervisor of the host OS (e.g., where the one or more control messages are first-type physical hardware device control messages that include the first-type physical hardware device address associated with the physical hardware device).

As shown by reference number 116, the kernel device driver of the kernel of the host OS may send the one or more control messages to the physical hardware device (e.g., via the bus between the kernel device driver of the kernel of the host OS and the physical hardware device). Accordingly, the physical hardware device (e.g., a controller of the physical hardware device) may receive the one or more control messages from the kernel device driver of the kernel of the host OS (e.g., where the one or more control messages are first-type physical hardware device control messages that include the first-type physical hardware device address associated with the physical hardware device).

As shown by reference number 118, the physical hardware device may perform one or more actions based on the one or more control messages (e.g., the one or more control messages that the physical hardware device received from the kernel device driver of the kernel of the host OS). For example, when the one or more control messages include instructions for the physical hardware device to perform a read action, a write action, and/or another action, the physical hardware device (e.g., the controller of the physical hardware device) may process (e.g., parse and/or read) the one or more control messages to identify the instructions. Accordingly, based on the instructions, the physical hardware device (e.g., the controller of the physical hardware device) may perform the read action, the write action, and/or the other action.

In this way, sending, by the process of the guest OS and to the physical hardware device (e.g., via the physical hardware device driver of the kernel of the guest OS, the emulated physical hardware device of the hypervisor of the host OS, the hypervisor device driver of the hypervisor of the host OS, and/or the kernel device driver of the kernel of the host OS, as described herein), the one or more control messages is to cause control, by the process of the guest OS, of the physical hardware device based on the one or more control messages.

In some implementations, the physical hardware device (e.g., the controller of the physical hardware device) may generate, based on performing the one or more actions, one or more response messages that may include information associated with performing the one or more actions (e.g., information including a result of a read action, information indicating acknowledgment of a write action, and/or other information). The one or more response messages may be first-type physical hardware device response messages (e.g., one or more LPC response messages) that include an address associated with the process of the guest OS. The physical hardware device (e.g., the controller of the physical hardware device) may send the one or more response messages to the kernel device driver of the kernel of the host OS (e.g., via the bus between the physical hardware device and the kernel device driver), which may send the one or more response messages to the hypervisor device driver of the hypervisor of the host OS. The hypervisor device driver of the hypervisor of the host OS may update (e.g., in a similar manner as that described elsewhere herein) the one or more response messages to be second-type physical hardware device response messages (e.g., one or more PCIE response messages), and may send the one or more response messages to the emulated physical hardware device of the hypervisor, which may send the one or more response messages to the physical hardware device driver of the kernel of the guest OS. The physical hardware device driver of the kernel of the guest OS then may send the one or more response messages (e.g., that are second-type physical hardware device response messages that include the address associated with the process of the guest OS) to the process of the guest OS. In this way, the process of the guest OS may obtain information from the physical hardware device related to the one or more control messages that the process of the guest OS sent to the physical hardware device.

Figure 1D:
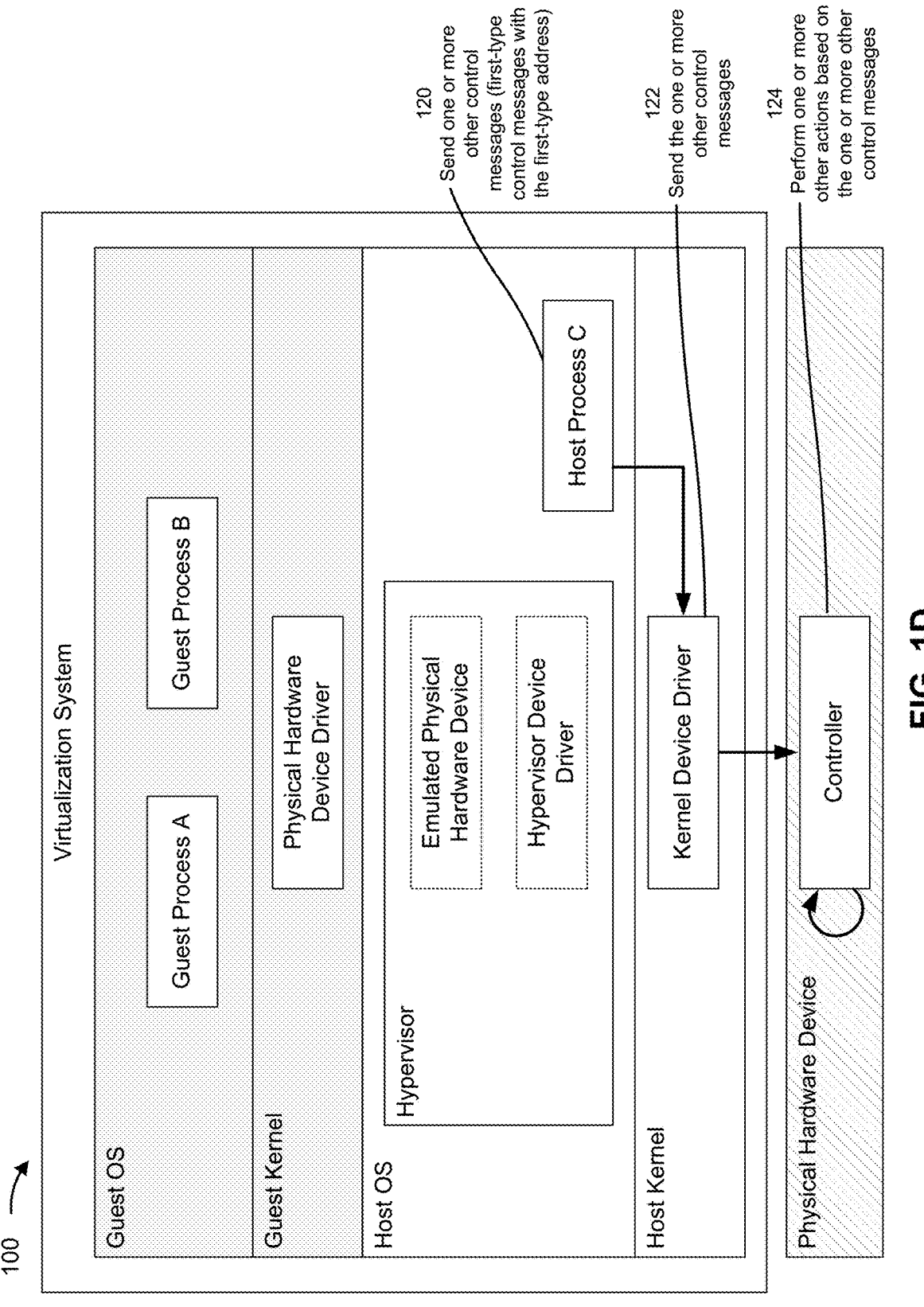

As shown in FIG. 1D, and by reference number 120, a process of the host OS (e.g., shown as host process C) may send one or more other control messages to control the physical hardware device. The one or more other control messages may include, for example, other instructions for the physical hardware device to perform another read action, another write action, and/or another action. The one or more other control messages may be first-type physical hardware device control messages that include the first-type physical hardware device address associated with the physical hardware device. For example, the one or more other control messages may be LPC control messages that include the LPC address associated with the physical hardware device. In some implementations, the process may send the one or more other control messages to the kernel device driver of the kernel of the host OS. Accordingly, the kernel device driver of the kernel of the host OS may receive the one or more other control messages from the process of the host OS.

As shown by reference number 122, the kernel device driver of the kernel of the host OS may send the one or more other control messages to the physical hardware device (e.g., via the bus between the kernel device driver of the kernel of the host OS and the physical hardware device). Accordingly, the physical hardware device (e.g., the controller of the physical hardware device) may receive the one or more other control messages from the kernel device driver of the kernel of the host OS (e.g., where the one or more other control messages are first-type physical hardware device control messages that include the first-type physical hardware device address associated with the physical hardware device).

As shown by reference number 124, the physical hardware device may perform one or more other actions based on the one or more other control messages (e.g., the one or more other control messages that the physical hardware device received from the kernel device driver of the kernel of the host OS). For example, when the one or more other control messages include the other instructions for the physical hardware device to perform the other read action, the other write action, and/or the other action, the physical hardware device (e.g., the controller of the physical hardware device) may process (e.g., parse and/or read) the one or more other control messages to identify the other instructions. Accordingly, based on the other instructions, the physical hardware device (e.g., the controller of the physical hardware device) may perform the other read action, the other write action, and/or the other action.

In this way, sending, to the physical hardware device and by the process of the host OS (e.g., via the physical hardware device driver of the kernel of the guest OS, as described herein), the one or more other control messages is to cause control, by the process of the host OS, of the physical hardware device based on the one or more other control messages.

In some implementations, the physical hardware device (e.g., the controller of the physical hardware device) may generate, based on performing the one or more other actions, one or more other response messages that may include information associated with performing the one or more other actions (e.g., information including a result of the other read action, information indicating acknowledgment of the other write action, and/or other information). The one or more other response messages may be first-type physical hardware device response messages (e.g., one or more LPC response messages) that include an address associated with the process of the host OS. The physical hardware device (e.g., the controller of the physical hardware device) may send the one or more other response messages to the kernel device driver of the kernel of the host OS (e.g., via the bus between the physical hardware device and the kernel device driver), which may send the one or more other response messages to the process of the host OS. In this way, the process of the host OS may obtain information from the physical hardware device related to the one or more other control messages that the process of the host OS sent to the physical hardware device.

As indicated above, FIGS. 1A-1D are provided as an example. Other examples may differ from what is described with regard to FIGS. 1A-1D.

Figure 2:
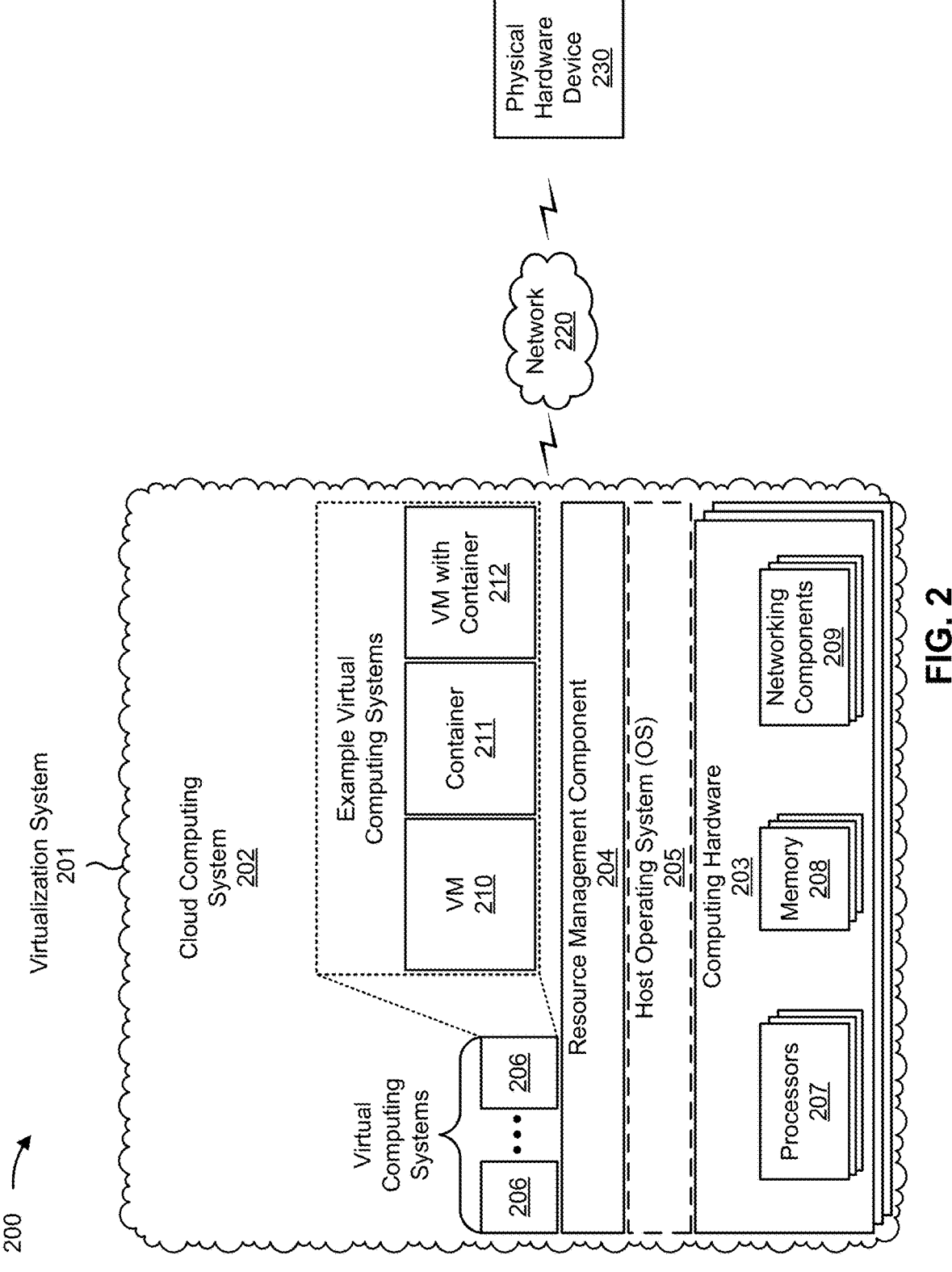
FIG. 2 is a diagram of an example environment in which systems and/or methods described herein may be implemented.

FIG. 2 is a diagram of an example environment 200 in which systems and/or methods described herein may be implemented. As shown in FIG. 2, environment 200 may include a virtualization system 201, which may include one or more elements of and/or may execute within a cloud computing system 202. The cloud computing system 202 may include one or more elements 203-212, as described in more detail below. As further shown in FIG. 2, environment 200 may include a network 220, and/or a physical hardware device 230. Devices and/or elements of environment 200 may interconnect via wired connections and/or wireless connections.

The cloud computing system 202 includes computing hardware 203, a resource management component 204, a host operating system (OS) 205, and/or one or more virtual computing systems 206 (e.g., that each include a guest OS). The cloud computing system 202 may execute on, for example, an Amazon Web Services platform, a Microsoft Azure platform, or a Snowflake platform. The resource management component 204 may perform virtualization (e.g., abstraction) of computing hardware 203 to create the one or more virtual computing systems 206. Using virtualization, the resource management component 204 enables a single computing device (e.g., a computer or a server) to operate like multiple computing devices, such as by creating multiple isolated virtual computing systems 206 from computing hardware 203 of the single computing device. In this way, computing hardware 203 can operate more efficiently, with lower power consumption, higher reliability, higher availability, higher utilization, greater flexibility, and lower cost than using separate computing devices.

Computing hardware 203 includes hardware and corresponding resources from one or more computing devices. For example, computing hardware 203 may include hardware from a single computing device (e.g., a single server) or from multiple computing devices (e.g., multiple servers), such as multiple computing devices in one or more data centers. As shown, computing hardware 203 may include one or more processors 207, one or more memories 208, and/or one or more networking components 209. Examples of a processor, a memory, and a networking component (e.g., a communication component) are described elsewhere herein.

The resource management component 204 includes a virtualization application (e.g., executing on hardware, such as computing hardware 203) capable of virtualizing computing hardware 203 to start, stop, and/or manage one or more virtual computing systems 206. For example, the resource management component 204 may include a hypervisor (e.g., a bare-metal or Type 1 hypervisor, a hosted or Type 2 hypervisor, or another type of hypervisor) or a virtual machine monitor, such as when the virtual computing systems 206 are virtual machines 210. Additionally, or alternatively, the resource management component 204 may include a container manager, such as when the virtual computing systems 206 are containers 211 (e.g., that comprise one or more threads). In some implementations, the resource management component 204 executes within and/or in coordination with a host operating system 205.

A virtual computing system 206 includes a virtual environment that enables cloud-based execution of operations and/or processes described herein using computing hardware 203. As shown, a virtual computing system 206 may include a virtual machine 210, a container 211, or a hybrid environment 212 that includes a virtual machine and a container, among other examples. A virtual computing system 206 may execute one or more applications using a file system that includes binary files, software libraries, and/or other resources required to execute applications on a guest operating system (e.g., within the virtual computing system 206) or the host operating system 205.

Although the virtualization system 201 may include one or more elements 203-212 of the cloud computing system 202, may execute within the cloud computing system 202, and/or may be hosted within the cloud computing system 202, in some implementations, the virtualization system 201 may not be cloud-based (e.g., may be implemented outside of a cloud computing system) or may be partially cloud-based. For example, the virtualization system 201 may include one or more devices that are not part of the cloud computing system 202, such as device 300 of FIG. 3, which may include a standalone server or another type of computing device. The virtualization system 201 may perform one or more operations and/or processes described in more detail elsewhere herein.

The network 220 includes one or more wired and/or wireless networks. For example, the network 220 may include a wireless wide area network (e.g., a cellular network or a public land mobile network), a local area network (e.g., a wired local area network or a wireless local area network (WLAN), such as a Wi-Fi network), a personal area network (e.g., a Bluetooth network), a near-field communication network, a telephone network, a private network, the Internet, and/or a combination of these or other types of networks. The network 220 enables communication among the devices of environment 200.

The physical hardware device 230 includes one or more devices capable of receiving, generating, storing, processing, and/or providing information, as described elsewhere herein. The physical hardware device 230 may include a communication device and/or a computing device. For example, the physical hardware device 230 may include a database, a server, a database server, an application server, a client server, a web server, a host server, a proxy server, a virtual server (e.g., executing on computing hardware), a server in a cloud computing system, a device that includes computing hardware used in a cloud computing environment, or a similar type of device. The physical hardware device 230 may communicate with one or more other devices of environment 200, as described elsewhere herein.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

The foregoing disclosure provides illustration and description, but is not intended to be exhaustive or to limit the implementations to the precise forms disclosed. Modifications and variations may be made in light of the above disclosure or may be acquired from practice of the implementations.

Figure 3:
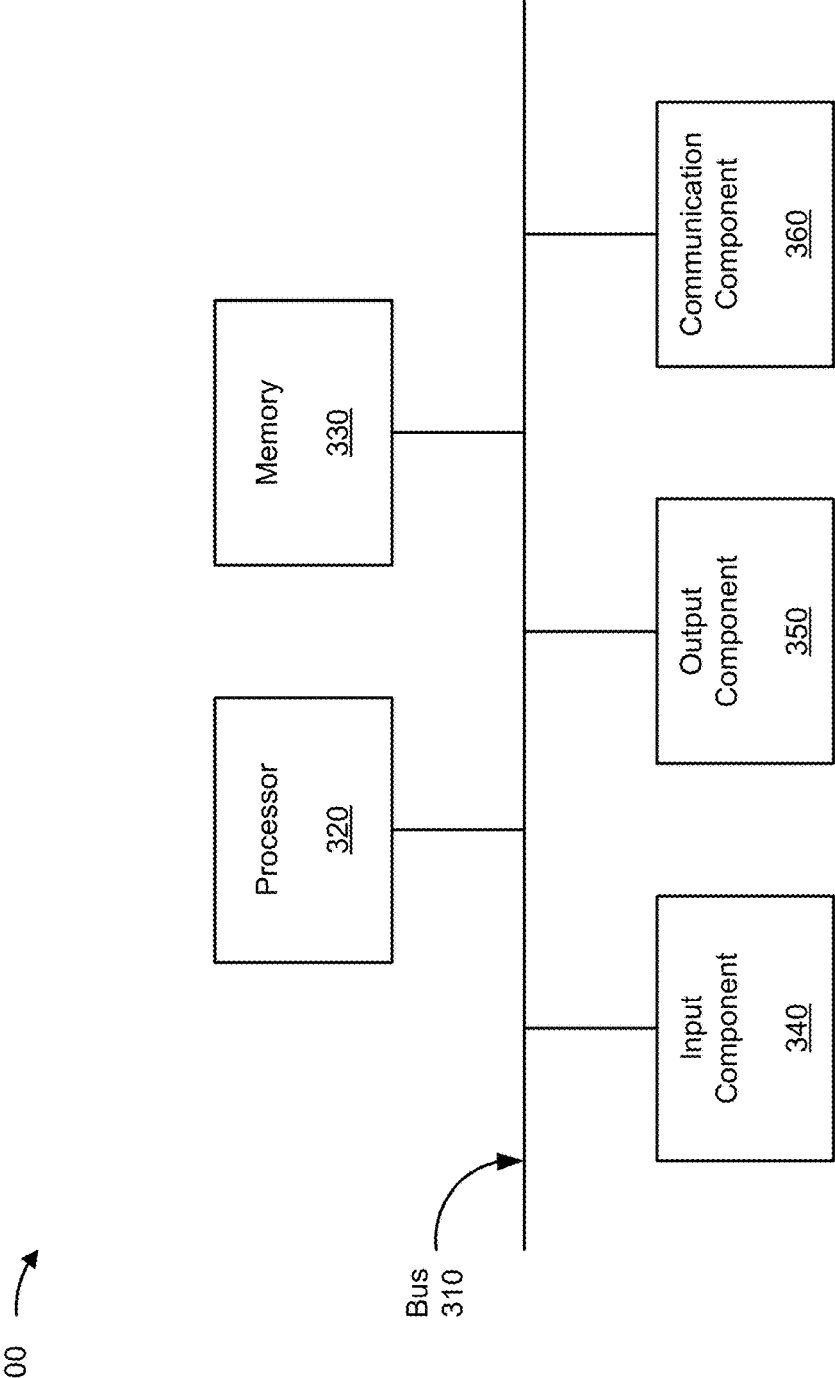
FIGS. 3 and 4 are diagrams of example components of one or more devices of FIG. 2.

FIG. 3 is a diagram of example components of a device 300, which may correspond to virtualization system 201, computing hardware 203, and/or physical hardware device 230. In some implementations, virtualization system 201, computing hardware 203, and/or physical hardware device 230 includes one or more devices 300 and/or one or more components of device 300. As shown in FIG. 3, device 300 may include a bus 310, a processor 320, a memory 330, an input component 340, an output component 350, and a communication component 360.

Bus 310 includes one or more components that enable wired and/or wireless communication among the components of device 300. Bus 310 may couple together two or more components of FIG. 3, such as via operative coupling, communicative coupling, electronic coupling, and/or electric coupling. Processor 320 includes a central processing unit, a graphics processing unit, a microprocessor, a controller, a microcontroller, a digital signal processor, a field-programmable gate array, an application-specific integrated circuit, and/or another type of processing component. Processor 320 is implemented in hardware, firmware, or a combination of hardware and software. In some implementations, processor 320 includes one or more processors capable of being programmed to perform one or more operations or processes described elsewhere herein.

Memory 330 includes volatile and/or nonvolatile memory. For example, memory 330 may include random access memory (RAM), read only memory (ROM), a hard disk drive, and/or another type of memory (e.g., a flash memory, a magnetic memory, and/or an optical memory). Memory 330 may include internal memory (e.g., RAM, ROM, or a hard disk drive) and/or removable memory (e.g., removable via a universal serial bus connection). Memory 330 may be a non-transitory computer-readable medium. Memory 330 stores information, instructions, and/or software (e.g., one or more software applications) related to the operation of device 300. In some implementations, memory 330 includes one or more memories that are coupled to one or more processors (e.g., processor 320), such as via bus 310.

Input component 340 enables device 300 to receive input, such as user input and/or sensed input. For example, input component 340 may include a touch screen, a keyboard, a keypad, a mouse, a button, a microphone, a switch, a sensor, a global positioning system sensor, an accelerometer, a gyroscope, and/or an actuator. Output component 350 enables device 300 to provide output, such as via a display, a speaker, and/or a light-emitting diode. Communication component 360 enables device 300 to communicate with other devices via a wired connection and/or a wireless connection. For example, communication component 360 may include a receiver, a transmitter, a transceiver, a modem, a network interface card, and/or an antenna.

Device 300 may perform one or more operations or processes described herein. For example, a non-transitory computer-readable medium (e.g., memory 330) may store a set of instructions (e.g., one or more instructions or code) for execution by processor 320. Processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry is used instead of or in combination with the instructions to perform one or more operations or processes described herein. Additionally, or alternatively, processor 320 may be configured to perform one or more operations or processes described herein. Thus, implementations described herein are not limited to any specific combination of hardware circuitry and software.

The number and arrangement of components shown in FIG. 3 are provided as an example. Device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
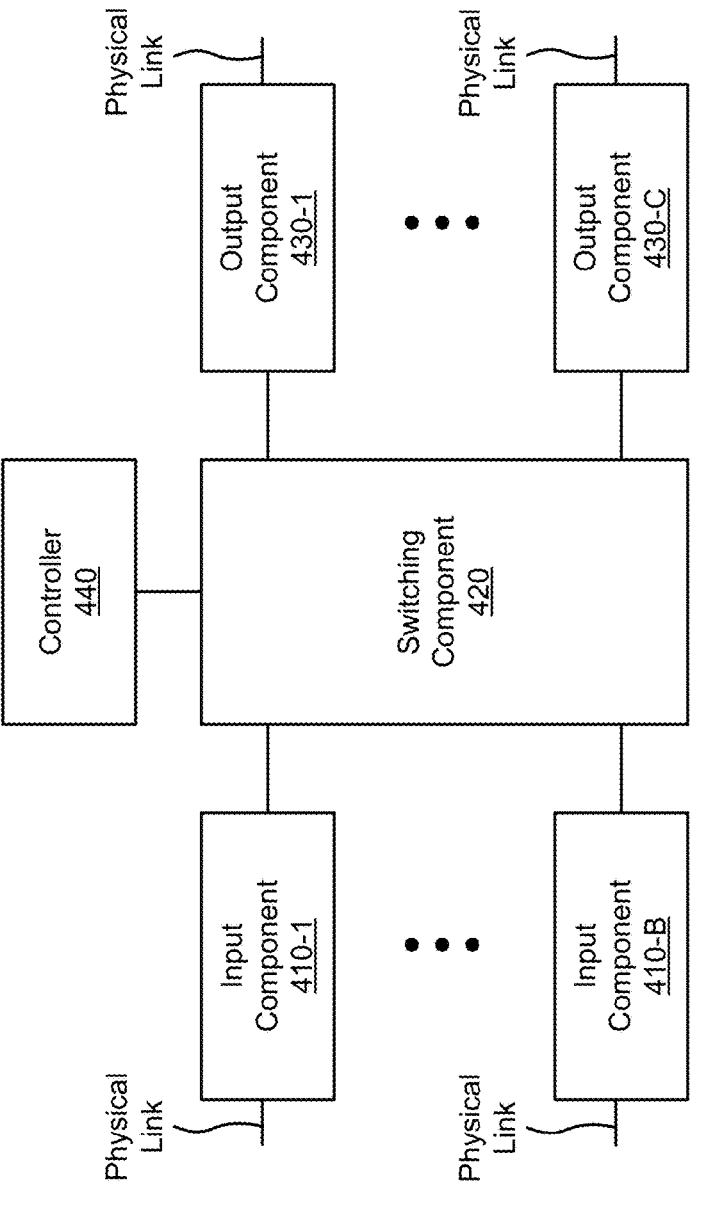

FIG. 4 is a diagram of example components of a device 400. Device 400 may correspond to virtualization system 201, computing hardware 203, and/or physical hardware device 230. In some implementations, virtualization system 201, computing hardware 203, and/or physical hardware device 230 may include one or more devices 400 and/or one or more components of device 400. As shown in FIG. 4, device 400 may include one or more input components 410-1 through 410-B (B≥1) (hereinafter referred to collectively as input components 410, and individually as input component 410), a switching component 420, one or more output components 430-1 through 430-C (C≥1) (hereinafter referred to collectively as output components 430, and individually as output component 430), and a controller 440.

Input component 410 may be one or more points of attachment for physical links and may be one or more points of entry for incoming traffic, such as packets. Input component 410 may process incoming traffic, such as by performing data link layer encapsulation or decapsulation. In some implementations, input component 410 may transmit and/or receive packets. In some implementations, input component 410 may include an input line card that includes one or more packet processing components (e.g., in the form of integrated circuits), such as one or more interface cards (IFCs), packet forwarding components, line card controller components, input ports, processors, memories, and/or input queues. In some implementations, device 400 may include one or more input components 410.

Switching component 420 may interconnect input components 410 with output components 430. In some implementations, switching component 420 may be implemented via one or more crossbars, via busses, and/or with shared memories. The shared memories may act as temporary buffers to store packets from input components 410 before the packets are eventually scheduled for delivery to output components 430. In some implementations, switching component 420 may enable input components 410, output components 430, and/or controller 440 to communicate with one another.

Output component 430 may store packets and may schedule packets for transmission on output physical links. Output component 430 may support data link layer encapsulation or decapsulation, and/or a variety of higher-level protocols. In some implementations, output component 430 may transmit packets and/or receive packets. In some implementations, output component 430 may include an output line card that includes one or more packet processing components (e.g., in the form of integrated circuits), such as one or more IFCs, packet forwarding components, line card controller components, output ports, processors, memories, and/or output queues. In some implementations, device 400 may include one or more output components 430. In some implementations, input component 410 and output component 430 may be implemented by the same set of components (e.g., and input/output component may be a combination of input component 410 and output component 430).

Controller 440 includes a processor in the form of, for example, a CPU, a GPU, an APU, a microprocessor, a microcontroller, a DSP, an FPGA, an ASIC, and/or another type of processor. The processor is implemented in hardware, firmware, or a combination of hardware and software.

In some implementations, controller 440 may include one or more processors that can be programmed to perform a function.

In some implementations, controller 440 may include a RAM, a ROM, and/or another type of dynamic or static storage device (e.g., a flash memory, a magnetic memory, an optical memory, etc.) that stores information and/or instructions for use by controller 440.

In some implementations, controller 440 may communicate with other devices, networks, and/or systems connected to device 400 to exchange information regarding network topology. Controller 440 may create routing tables based on the network topology information, may create forwarding tables based on the routing tables, and may forward the forwarding tables to input components 410 and/or output components 430. Input components 410 and/or output components 430 may use the forwarding tables to perform route lookups for incoming and/or outgoing packets.

Controller 440 may perform one or more processes described herein. Controller 440 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or storage component associated with controller 440 from another computer-readable medium or from another device via a communication interface. When executed, software instructions stored in a memory and/or storage component associated with controller 440 may cause controller 440 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 4 are provided as an example. In practice, device 400 may include additional components, fewer components, different components, or differently arranged components than those shown in FIG. 4. Additionally, or alternatively, a set of components (e.g., one or more components) of device 400 may perform one or more functions described as being performed by another set of components of device 400.

FIG. 5 is a flowchart of an example process 500 associated with physical hardware device access via emulation. In some implementations, one or more process blocks of FIG. 5 are performed by a virtualization system (e.g., virtualization system 201). In some implementations, one or more process blocks of FIG. 5 are performed by another device or a group of devices separate from or including the virtualization system, such as computing hardware (e.g., computing hardware 203), and/or a physical hardware device (e.g., physical hardware device 230). Additionally, or alternatively, one or more process blocks of FIG. 5 may be performed by one or more components of device 300, such as processor 320, memory 330, input component 340, output component 350, and/or communication component 360; one or more components of device 400, such as input component 410, switching component 420, output component 430, and/or controller 440; and/or one or more other components.

As shown in FIG. 5, process 500 may include receiving, by a physical hardware device driver of a kernel of a guest OS of the virtualization system and from a process of the guest OS, one or more control messages to control a physical hardware device (block 510). For example, the virtualization system may receive, by a physical hardware device driver of a kernel of a guest OS of the virtualization system and from a process of the guest OS, one or more control messages to control a physical hardware device, as described above. In some implementations, the physical hardware device is a first-type physical hardware device. In some implementations, the one or more control messages are second-type physical hardware device control messages that include a second-type physical hardware device address associated with the physical hardware device.

As further shown in FIG. 5, process 500 may include determining, by the physical hardware device driver of the kernel of the guest OS and based on the second-type physical hardware device address included in the one or more control messages, a first-type physical hardware device address associated with the physical hardware device (block 520). For example, the virtualization system may determine, by the physical hardware device driver of the kernel of the guest OS and based on the second-type physical hardware device address included in the one or more control messages, a first-type physical hardware device address associated with the physical hardware device, as described above.

As further shown in FIG. 5, process 500 may include updating, by the physical hardware device driver of the kernel of the guest OS, the one or more control messages to include the first-type physical hardware device address (block 530). For example, the virtualization system may update, by the physical hardware device driver of the kernel of the guest OS, the one or more control messages to include the first-type physical hardware device address, as described above.

As further shown in FIG. 5, process 500 may include sending, by the physical hardware device driver of the kernel of the guest OS and to an emulated physical hardware device of a hypervisor of a host OS of the virtualization system, the one or more control messages (block 540). For example, the virtualization system may send, by the physical hardware device driver of the kernel of the guest OS and to an emulated physical hardware device of a hypervisor of a host OS of the virtualization system, the one or more control messages, as described above.

Process 500 may include additional implementations, such as any single implementation or any combination of implementations described below and/or in connection with one or more other processes described elsewhere herein.

In a first implementation, sending the one or more control messages is to cause control, by the process, of the physical hardware device based on the one or more control messages.

In a second implementation, alone or in combination with the first implementation, process 500 includes receiving, by the emulated physical hardware device of the hypervisor of the host OS and from the physical hardware device driver of the guest OS, the one or more control messages; sending, by the emulated physical hardware device of the hypervisor of the host OS and to a hypervisor device driver of the hypervisor of the host OS, the one or more control messages; updating, by the hypervisor device driver of the hypervisor of the host OS, the one or more control messages to be first-type physical hardware device control messages that include the first-type physical hardware device address associated with the physical hardware device; sending, by the hypervisor device driver of the hypervisor of the host OS, to a kernel device driver of a kernel of the host OS, and based on updating the one or more control messages, the one or more control messages; receiving, by the kernel device driver of the kernel of the host OS and from the hypervisor device driver of the hypervisor of the host OS, the one or more control messages; and sending, by the kernel device driver of the kernel of the host OS and to the physical hardware device, the one or more control messages.

In a third implementation, alone or in combination with one or more of the first and second implementations, sending, to the physical hardware device, the one or more control messages is to cause control, by the process, of the physical hardware device based on the one or more control messages.

In a fourth implementation, alone or in combination with one or more of the first through third implementations, process 500 includes receiving, by the kernel device driver of the kernel of the host OS and from another process of the host OS, one or more other control messages to control the physical hardware device, wherein the one or more control messages are first-type physical hardware device control messages that include the first-type physical hardware device address associated with the physical hardware device; and sending, by the kernel device driver of the kernel of the host OS and to the physical hardware device, the one or more other control messages.

In a fifth implementation, alone or in combination with one or more of the first through fourth implementations, sending, to the physical hardware device, the one or more other control messages is to cause control, by the other process, of the physical hardware device based on the one or more other control messages.

In a sixth implementation, alone or in combination with one or more of the first through fifth implementations, the first-type physical hardware device address has a first bit length, the second-type physical hardware device address has a second bit length, and the first bit length is different from the second bit length.

Although FIG. 5 shows example blocks of process 500, in some implementations, process 500 includes additional blocks, fewer blocks, different blocks, or differently arranged blocks than those depicted in FIG. 5. Additionally, or alternatively, two or more of the blocks of process 500 may be performed in parallel.

The foregoing disclosure provides illustration and description, but is not intended to be exhaustive or to limit the implementations to the precise forms disclosed. Modifications and variations may be made in light of the above disclosure or may be acquired from practice of the implementations.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items, and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A non-transitory computer-readable medium storing a set of instructions, the set of instructions comprising:

one or more instructions that, when executed by one or more processors of a virtualization system, cause the virtualization system to:

receive, by a physical hardware device driver of a kernel of a guest operating system (OS) of the virtualization system and from a process of the guest OS, one or more control messages to control a low pin count (LPC) physical hardware device, wherein the one or more control messages are peripheral component interconnect express (PCIEe) control messages that include a PCIe address associated with the LPC physical hardware device;

determine, by the physical hardware device driver of the kernel of the guest OS and based on the PCIe address included in the one or more control messages, an LPC address associated with the physical hardware device;

update, by the physical hardware device driver of the kernel of the guest OS, the one or more control messages to include the LPC address;

send, by the physical hardware device driver of the kernel of the guest OS and to an emulated physical hardware device of a hypervisor of a host OS of the virtualization system, the one or more control messages;

receive, by the emulated physical hardware device of the hypervisor of the host OS and from the physical hardware device driver of the guest OS, the one or more control messages;

send, by the emulated physical hardware device of the hypervisor of the host OS and to a hypervisor device driver of the hypervisor of the host OS, the one or more control messages; and update, by the hypervisor device driver of the hypervisor of the host OS, the one or more control messages to be LPC control messages that include the LPC address associated with the physical hardware device.

2. The non-transitory computer-readable medium of claim 1, wherein sending the one or more control messages is to cause control of the physical hardware device by the process of the guest OS based on the one or more control messages.

3. The non-transitory computer-readable medium of claim 1, wherein the one or more instructions, when executed by the one or more processors, further cause the virtualization system to:

send, by the hypervisor device driver of the hypervisor of the host OS, to a kernel device driver of a kernel of the host OS, and based on updating the one or more control messages, the one or more control messages;

receive, by the kernel device driver of the kernel of the host OS and from the hypervisor device driver of the hypervisor of the host OS, the one or more control messages; and send, by the kernel device driver of the kernel of the host OS and to the physical hardware device, the one or more control messages.

4. The non-transitory computer-readable medium of claim 3, wherein sending, to the physical hardware device, the one or more control messages is to cause control of the physical hardware device by the process of the guest OS based on the one or more control messages.

5. The non-transitory computer-readable medium of claim 3, wherein the one or more instructions, when executed by the one or more processors, further cause the virtualization system to:

receive, by the kernel device driver of the kernel of the host OS and from a process of the host OS, one or more other control messages to control the physical hardware device, wherein the one or more control messages are LPC control messages that include the LPC address associated with the physical hardware device; and send, by the kernel device driver of the kernel of the host OS and to the physical hardware device, the one or more other control messages.

6. The non-transitory computer-readable medium of claim 5, wherein sending, to the physical hardware device, the one or more other control messages is to cause control of the physical hardware device by the process of the host OS based on the one or more other control messages.

7. The non-transitory computer-readable medium of claim 1, wherein:

the LPC address associated with the physical hardware device is 8 bits; and the PCIe address associated with the physical hardware device is 32 bits.

8. A virtualization system, comprising:

one or more memories; and one or more processors to:

receive, by a physical hardware device driver of a kernel of a guest operating system (OS) of the virtualization system and from a process of the guest OS, one or more control messages to control a physical hardware device, wherein the physical hardware device is a first-type physical hardware device, and wherein the one or more control messages are second-type physical hardware device control messages that include a second-type physical hardware device address associated with the physical hardware device;

determine, by the physical hardware device driver of the kernel of the guest OS and based on the second-type physical hardware device address included in the one or more control messages, a first-type physical hardware device address associated with the physical hardware device;

update, by the physical hardware device driver of the kernel of the guest OS, the one or more control messages to include the first-type physical hardware device address;

send, by the physical hardware device driver of the kernel of the guest OS and to an emulated physical hardware device of a hypervisor of a host OS of the virtualization system, the one or more control messages;

receive, by the emulated physical hardware device of the hypervisor of the host OS and from the physical hardware device driver of the guest OS, the one or more control messages;

send, by the emulated physical hardware device of the hypervisor of the host OS and to a hypervisor device driver of the hypervisor of the host OS, the one or more control messages; and update, by the hypervisor device driver of the hypervisor of the host OS, the one or more control messages to be first-type physical hardware device control messages that include the first-type physical hardware device address associated with the physical hardware device.

9. The virtualization system of claim 8,
wherein sending the one or more control messages is to cause control of the physical hardware device by the process of the guest OS based on the one or more control messages.

10. The virtualization system of claim 8,
wherein the one or more processors are further to:
send, by the hypervisor device driver of the hypervisor of the host OS, to a kernel device driver of a kernel of the host OS, and based on updating the one or more control messages, the one or more control messages;
receive, by the kernel device driver of the kernel of the host OS and from the hypervisor device driver of the hypervisor of the host OS, the one or more control messages; and
send, by the kernel device driver of the kernel of the host OS and to the physical hardware device, the one or more control messages.

11. The virtualization system of claim 10,
wherein sending, to the physical hardware device, the one or more control messages is to cause control of the physical hardware device by the process of the guest OS based on the one or more control messages.

12. The virtualization system of claim 10,
wherein the one or more processors are further to:
receive, by the kernel device driver of the kernel of the host OS and from a process of the host OS, one or more other control messages to control the physical hardware device,
wherein the one or more control messages are first-type physical hardware device control messages that include the first-type physical hardware device address associated with the physical hardware device; and send, by the kernel device driver of the kernel of the host OS and to the physical hardware device, the one or more other control messages.

13. The virtualization system of claim 12,
wherein sending, to the physical hardware device, the one or more other control messages is to cause control of the physical hardware device by the process of the host OS based on the one or more other control messages.

14. The virtualization system of claim 8, wherein:
the first-type physical hardware device address has a first bit length;
the second-type physical hardware device address has a second bit length; and
the first bit length is different from the second bit length.

15. A method, comprising:
sending, by a physical hardware device driver of a kernel of a guest operating system (OS) of a virtualization system and to an emulated physical hardware device of a hypervisor of a host OS of the virtualization system, one or more control messages to control a physical hardware device,
wherein the one or more control messages are second-type physical hardware device control messages that include a second-type physical hardware device address associated with the physical hardware device and a first-type physical hardware device address associated with the physical hardware device, and
wherein the physical hardware device is a first-type physical hardware device;
receiving, by the emulated physical hardware device of the hypervisor of the host OS and from the physical hardware device driver of the guest OS, the one or more control messages;
sending, by the emulated physical hardware device of the hypervisor of the host OS and to a hypervisor device driver of the hypervisor of the host OS, the one or more control messages;
updating, by the hypervisor device driver of the hypervisor of the host OS, the one or more control messages to be first-type physical hardware device control messages that include the first-type physical hardware device address associated with the physical hardware device;
sending, by the hypervisor device driver of the hypervisor of the host OS, to a kernel device driver of a kernel of the host OS, and based on updating the one or more control messages, the one or more control messages;
receiving, by the kernel device driver of the kernel of the host OS and from the hypervisor device driver of the hypervisor of the host OS, the one or more control messages; and
sending, by the kernel device driver of the kernel of the host OS and to the physical hardware device, the one or more control messages.

16. The method of claim 15,
wherein sending, to the physical hardware device, the one or more control messages is to cause control, by a process of the guest OS, of the physical hardware device based on the one or more control messages.

17. The method of claim 15, further comprising:
receiving, by the kernel device driver of the kernel of the host OS and from a process of the host OS, one or more other control messages to control the physical hardware device, wherein the one or more other control messages are first-type physical hardware device control messages that include the first-type physical hardware device address associated with the physical hardware device; and sending, by the kernel device driver of the kernel of the host OS and to the physical hardware device, the one or more other control messages.

18. The method of claim 17, wherein sending, to the physical hardware device, the one or more other control messages is to cause control of the physical hardware device by the process of the guest OS based on the one or more other control messages.

19. The method of claim 15, wherein:

the second-type physical hardware device control messages are peripheral component interconnect express (PCIe) control messages; and the first-type physical hardware device control messages are low pin count (LPC) control messages.

20. The method of claim 15, further comprising, prior to the physical hardware device driver of the kernel of the guest OS sending the one or more control messages to the emulated physical hardware device of the hypervisor of the host OS:

receiving, by the physical hardware device driver of the kernel of the guest OS, from a process of the guest OS, the one or more control messages, wherein the one or more control messages include a second-type physical hardware device address associated with the physical hardware device;

determining, by the physical hardware device driver of the kernel of the guest OS and based on the second-type physical hardware device address included in the one or more control messages, the first-type physical hardware device address associated with the physical hardware device; and updating, by the physical hardware device driver of the kernel of the guest OS, the one or more control messages to include the first-type physical hardware device address.

* * * * *